US009869991B2

United States Patent
Yasuda et al.

(10) Patent No.: US 9,869,991 B2
(45) Date of Patent: Jan. 16, 2018

(54) CONTROL DEVICE AND CONTROL METHOD FOR BLOCKING A CONTROL SIGNAL TO A TARGET DEVICE

(75) Inventors: Yorimasa Yasuda, Tokyo (JP); Shuya Sano, Tokyo (JP); Tomohiro Miyazaki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 682 days.

(21) Appl. No.: 14/400,940

(22) PCT Filed: Jul. 17, 2012

(86) PCT No.: PCT/JP2012/068129
§ 371 (c)(1),
(2), (4) Date: Nov. 13, 2014

(87) PCT Pub. No.: WO2014/013554
PCT Pub. Date: Jan. 23, 2014

(65) Prior Publication Data
US 2015/0073599 A1    Mar. 12, 2015

(51) Int. Cl.
G05B 13/00    (2006.01)
G05B 19/401   (2006.01)
G05B 9/02     (2006.01)

(52) U.S. Cl.
CPC ............ *G05B 19/401* (2013.01); *G05B 9/02* (2013.01); *G05B 2219/23098* (2013.01)

(58) Field of Classification Search
None
See application file for complete search history.

(56) References Cited

U.S. PATENT DOCUMENTS 6,426,873 B1 *  7/2002  Minase ............... G11B 17/056
                                        312/223.1
2004/0078116 A1  4/2004  Hashimoto et al.
(Continued)

FOREIGN PATENT DOCUMENTS

JP   4-291859 A   10/1992
JP   7-40348 U    7/1995
(Continued)

OTHER PUBLICATIONS

International Search Report of PCT/JP2012/068129, dated Aug. 14, 2012. [PCT/ISA/210].

*Primary Examiner* — Adam Lee
(74) *Attorney, Agent, or Firm* — Sughrue Mion, PLLC; Richard C. Turner

(57) ABSTRACT

Provided is a control device that includes a plurality of communication units that receive data from measurement control devices; a control unit that calculates an operation signal for controlling a controlled device on the basis of the data from the communication units and that outputs the operation signal to the controlled device; a storage unit that stores the data; a first monitoring unit and a second monitoring unit that perform a calculation on the basis of the data to calculate a calculation value, that determine whether the calculation value satisfies a blocking condition, and that output a blocking signal when the calculation value satisfies the blocking condition; and a first blocking unit and a second blocking unit that block the operation signal to the controlled device upon receiving the blocking signal output from at least either one of the first monitoring unit and the second monitoring unit.

7 Claims, 4 Drawing Sheets

(56) References Cited

U.S. PATENT DOCUMENTS

| | | | |
|---|---|---|---|
| 2007/0052377 A1* | 3/2007 | Fuwa | B62K 3/00 318/139 |
| 2009/0198379 A1* | 8/2009 | Komuro | B25J 9/1674 700/250 |
| 2011/0221377 A1* | 9/2011 | Ueno | G05B 19/4062 318/565 |
| 2013/0116876 A1* | 5/2013 | Park | B60L 3/00 701/22 |
| 2013/0154538 A1* | 6/2013 | Ogawa | G05B 19/4062 318/565 |
| 2013/0241316 A1* | 9/2013 | Morikawa | G05B 19/4061 307/326 |
| 2013/0278191 A1* | 10/2013 | Zushi | H02H 7/122 318/400.22 |
| 2013/0317710 A1* | 11/2013 | Sakurai | E02F 9/2025 701/50 |
| 2014/0018958 A1* | 1/2014 | Ueno | B25J 9/1674 700/255 |

FOREIGN PATENT DOCUMENTS

| | | | |
|---|---|---|---|
| JP | 10-340102 | A | 12/1998 |
| JP | 2000-299716 | A | 10/2000 |
| JP | 2004-148488 | A | 5/2004 |
| JP | 2009-4881 | A | 1/2009 |
| JP | 2011-28571 | A | 2/2011 |
| JP | 2011-188623 | A | 9/2011 |
| JP | 2011-257889 | A | 12/2011 |

* cited by examiner

CONTROL DEVICE AND CONTROL METHOD FOR BLOCKING A CONTROL SIGNAL TO A TARGET DEVICE

CROSS REFERENCE TO RELATED APPLICATIONS

This application is a National Stage of International Application No. PCT/JP2012/068129filed Jul. 17, 2012, the contents of all of which are incorporated herein by reference in their entirety.

FIELD

The present invention relates to a control device and a control method.

BACKGROUND

Control devices exist that control controlled devices, such as mechanical devices, equipment and machinery, and that double monitor for improved safety communication data transmitted and received through a communication network (see, for example, Patent Literature 1). The safety control system described in Patent Literature 1 is connected to an external controller through a network and includes a duplex system of double processing a safety signal from the external controller by using two processors to ensure safety.

CITATION LIST

Patent Literature

Patent Literature 1: Japanese Patent Application Laid-open No. 2011-257889

SUMMARY

Technical Problem

The conventional safety control system described in Patent Literature 1 is dedicated to one single network that communicates with the external controller. That is, the safety control system connects to the external controller through only one single network. However, some common control devices need to be connected to a plurality of networks to communicate with a plurality of devices. For example, in addition to being connected to an external controller, some of the motor control devices that control a motor are also connected through networks to an encoder that detects the rotation angle of the motor as well as a linear scale that detects the machine position. In this case, a motor control device is required to handle three networks.

However, the conventional safety control system described in Patent Literature 1 is configured to target only one single network. Therefore, there is a problem in that functional safety cannot be achieved with the conventional safety control system for a plurality of networks. Particularly, in the case of communicating with a plurality of networks asynchronously, it is necessary to simultaneously process data transmitted to and received from the networks. However, the conventional safety control system described in Patent Literature 1 is not configured to be compatible with such processing as described above.

The present invention has been achieved to solve the above problems, and an object of the present invention is to provide a control device and a control method that monitor data received from a plurality of networks by using a duplex system and that can deactivate a controlled device safely when there is an abnormality in communication data.

Solution to Problem

To achieve the object mentioned above, the present invention relates to a control device that performs calculations on the basis of data from a plurality of measurement control devices connected to the control device through a plurality of networks and that outputs an operation signal to a controlled device. The control device includes: a plurality of communication units that are connected to the measurement control devices, respectively, and that receive data from the measurement control devices; a control unit that calculates an operation signal for controlling the controlled device on the basis of the data input from the communication units and that outputs the operation signal to the controlled device; a storage unit that stores therein the data input from the communication units; a first monitoring unit and a second monitoring unit that are independent of each other, that perform a predetermined calculation on the basis of the data obtained from the storage unit at a predetermined time to calculate a calculation value, that determine whether the calculation value satisfies a blocking condition for blocking the operation signal, and that output a blocking signal when the calculation value satisfies the blocking condition; and a blocking unit that blocks the operation signal output from the control unit to the controlled device upon receiving the blocking signal output from at least either one of the first monitoring unit and the second monitoring unit.

Advantageous Effects of Invention

According to the present invention, the control device includes a storage unit that temporarily stores therein data received at communication units; and a first monitoring unit and a second monitoring unit that perform calculations using data obtained from the storage unit at a predetermined timing and, when the result of the calculations satisfies a blocking condition, output the corresponding blocking signal for deactivating a controlled device. Therefore, it is possible to monitor communication data received from a plurality of networks and to deactivate the controlled device safely when an abnormality in the communication data is found.

DESCRIPTION OF EMBODIMENTS

Exemplary embodiments of a control device and a control method according to the present invention will be explained below in detail with reference to the accompanying drawings. Note that the present invention is not limited to these embodiments.

First Embodiment

Figure 1:
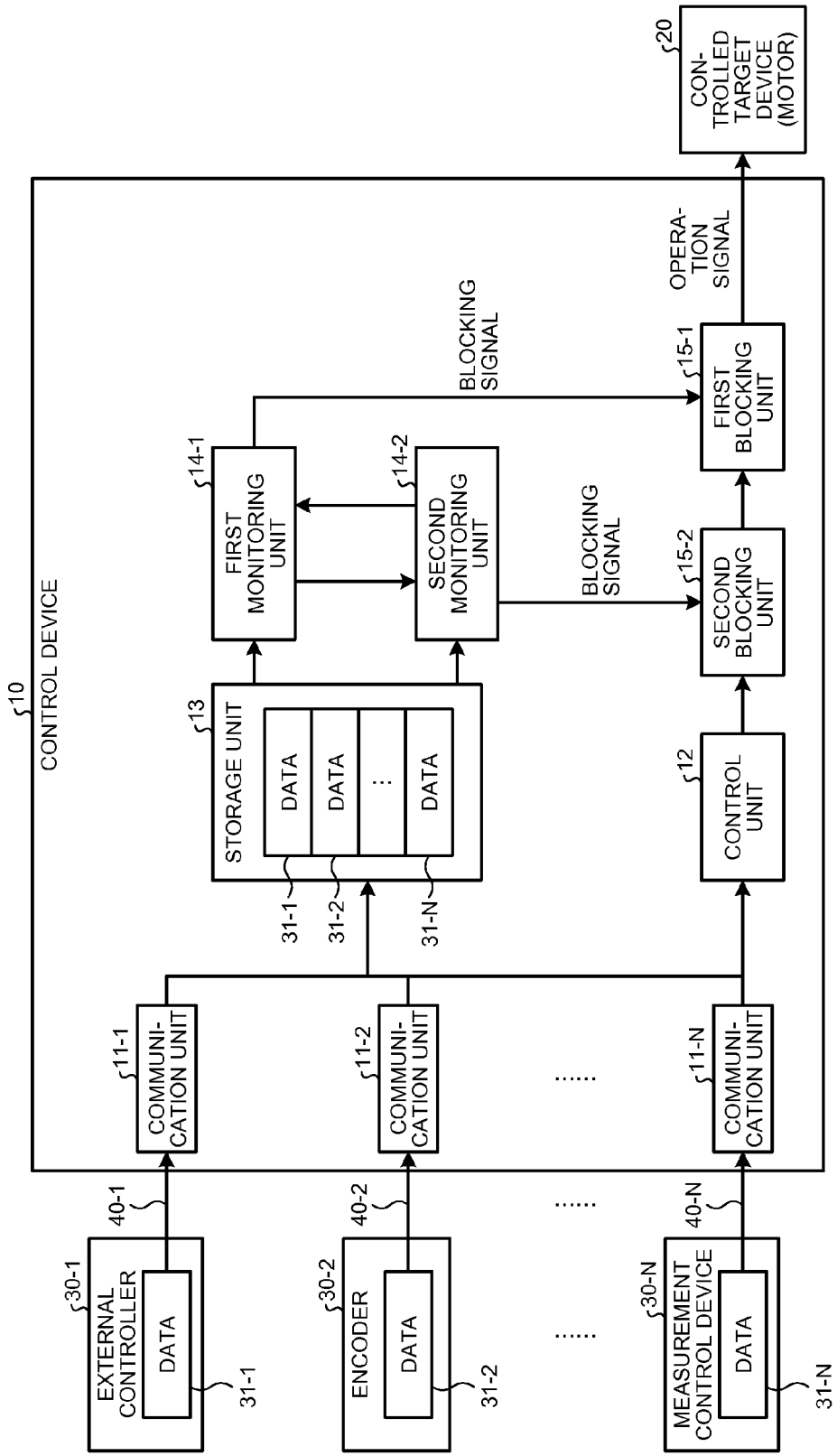
FIG. 1 is a block diagram schematically illustrating a configuration example of a control system that includes a control device according to a first embodiment.

FIG. 1 is a block diagram schematically illustrating a configuration example of a control system that includes a control device according to a first embodiment. The control system includes a control device 10, a controlled device 20, and measurement control devices 30-1 to 30-N (N is an integer equal to or larger than 2).

The control device 10 is connected to the controlled device 20, and it controls the operation of the controlled device 20. An example of the controlled device 20 can be a motor that drives a mechanical device. FIG. 1 illustrates a case where the controlled device 20 includes a motor.

The control device 10 is connected to a plurality of the measurement control devices 30-1 to 30-N through networks 40-1 to 40-N, respectively. On the basis of data sent from the measurement control devices 30-1 to 30-N, the control device 10 outputs an operation signal for controlling the controlled device 20. The measurement control devices 30-1 to 30-N include a controller that outputs data for driving the controlled device 20; a sensor that detects the operating condition of the controlled device 20; and other devices. The measurement control devices 30-1 to 30-N transmit data 31-1 to 31-N, respectively, to the control device 10. Examples of the measurement control devices 30-1 to 30-N include an external controller that outputs a command for operating the controlled device 20 and a sensor such as an encoder that detects the rotation angle of the motor included in the controlled device 20. FIG. 1 illustrates the case where the measurement control device 30-1 includes an external controller and the measurement control device 30-2 includes an encoder.

The control device 10 includes communication units 11-1 to 11-N, a control unit 12, a storage unit 13, a first monitoring unit 14-1, a second monitoring unit 14-2, a first blocking unit 15-1, and a second blocking unit 15-2.

The communication units 11-1 to 11-N are connected to the measurement control devices 30-1 to 30-N, respectively, through the networks 40-1 to 40-N and receive data from the measurement control devices 30-1 to 30-N.

The control unit 12 outputs an operation signal for controlling the controlled device 20 on the basis of the data received by the communication units 11-1 to 11-N. For example, the control unit 12 performs position control calculations such that the motor rotation angle that is input from the encoder (the measurement control device 30-2) follows a position command that is input from the external controller (the measurement control device 30-1) and outputs electric power that is an operation signal to the motor (the controlled device 20). The control unit 12 includes, for example, a CPU (Central Processing Unit).

The storage unit 13 temporarily stores therein the data 31-1 to 31-N received by the communication units 11-1 to 11-N, respectively, at predetermined addresses defined for each of the measurement control devices 30-1 to 30-N.

Both the first monitoring unit 14-1 and the second monitoring unit 14-2 use the data 31-1 to 31-N stored in the storage unit 13 as an input to perform calculations at a predetermined timing; determine whether the calculation result satisfies a blocking condition; and control the output of a blocking signal for blocking an output of the operation signal to the controlled device 20. The first monitoring unit 14-1 and the second monitoring unit 14-2, for example, each have a separate CPU that is different from the control unit 12.

Examples of a blocking condition include the following cases (1) to (4).
(1) Data from the measurement control devices 30-1 to 30-N is a command for deactivating the controlled device 20.
(2) A communication error is detected in data that is input from the measurement control devices 30-1 to 30-N.
(3) Data input to the first monitoring unit 14-1 and data input to the second monitoring unit 14-2 are checked and are found not to be identical to each other.
(4) Input data satisfies a predetermined condition. For example, the motor speed calculated on the basis of the data 31-2 in the encoder (the measurement control device 30-2) exceeds a predetermined value, or the difference between a position command from the external controller (the measurement control device 30-1) and the motor rotation angle from the encoder (the measurement control device 30-2) exceeds a predetermined value.

A calculation method using the data 31-1 to 31-N is defined for each of the blocking conditions in advance. A calculating process based on the calculation method is performed. A blocking signal output by the first monitoring unit 14-1 is input to the first blocking unit 15-1; and a blocking signal output by the second monitoring unit 14-2 is input to the second blocking unit 15-2. In case (3) mentioned above, the first monitoring unit 14-1 and the second monitoring unit 14-2 have a function of transmitting input data to each other and deciding whether both input data are the same.

When the blocking signal is input to the first blocking unit 15-1 and the second blocking unit 15-2, they block an operation signal output from the control unit 12 to the controlled device 20 so as to deactivate the controlled device 20. When the blocking signal is output from at least one of the first monitoring unit 14-1 and the second monitoring unit 14-2, the operation signal that has been output by the control unit 12 is blocked, and thus the operation signal is not input to the controlled device 20. Accordingly, the controlled device 20 is deactivated.

In FIG. 1, the first blocking unit 15-1 is configured to connect to the first monitoring unit 14-1 in series and the second blocking unit 15-2 connects to the second monitoring unit 14-2 in series. However, another configuration can be employed in which only a single blocking unit is used; the first monitoring unit 14-1 and the second monitoring unit 14-2 are connected to this blocking unit; and, upon receiving a blocking signal from either the first monitoring unit 14-1 or the second monitoring unit 14-2, the blocking unit blocks the operation signal.

Next, a controlling process operated by the control device 10 is explained below. The communication units 11-1 to 11-N receive the data 31-1 to 31-N from the measurement control devices 30-1 to 30-N respectively through the networks 40-1 to 40-N. The control unit 12 obtains the data 31-1 to 31-N sequentially from the communication units 11-1 to 11-N at a predetermined time, calculates operation data for controlling the controlled device 20, and outputs the operation data as an operation signal. Unless an operation signal is blocked by a monitoring process described later, the controlled device 20 is controlled according to the operation signal.

Figure 2:
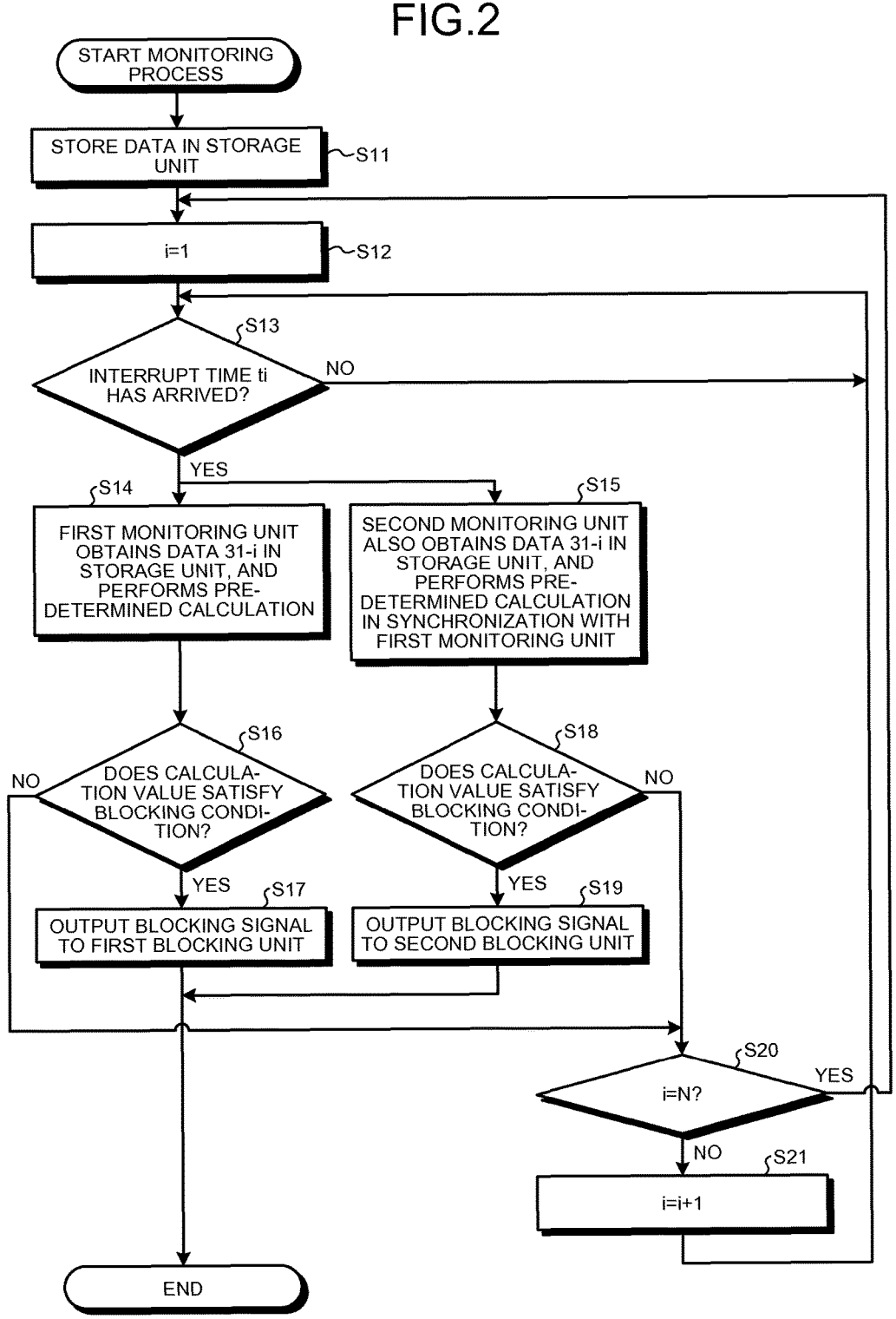
FIG. 2 is a flowchart illustrating an example of a procedure for a monitoring process according to the first embodiment.

Concurrently with the controlling process in the control unit 12, the first monitoring unit 14-1 and the second monitoring unit 14-2 also perform calculations using the data 31-1 to 31-N received from the communication units 11-1 to 11-N and operate a monitoring process to determine whether to stop the control of the controlled device 20 operated by the control unit 12. FIG. 2 is a flowchart illustrating an example of a procedure of a monitoring process according to the first embodiment. When the communication units 11-1 to 11-N receive the data 31-1 to 31-N, respectively, from the measurement control devices 30-1 to 30-N, the communication units 11-1 to 11-N store the received data 31-1 to 31-N in the storage unit 13 at the areas (addresses) assigned to each of the communication units 11-1 to 11-N (Step S11).

The first monitoring unit 14-1 and the second monitoring unit 14-2 then determine whether it is time ti to interrupt, at which the monitoring process is operated using the data 31-1, which is the first data. That is, the initial value of i is set to 1 (Step S12) to determine whether it is time ti to interrupt (=t1) (Step S13).

Figure 3:
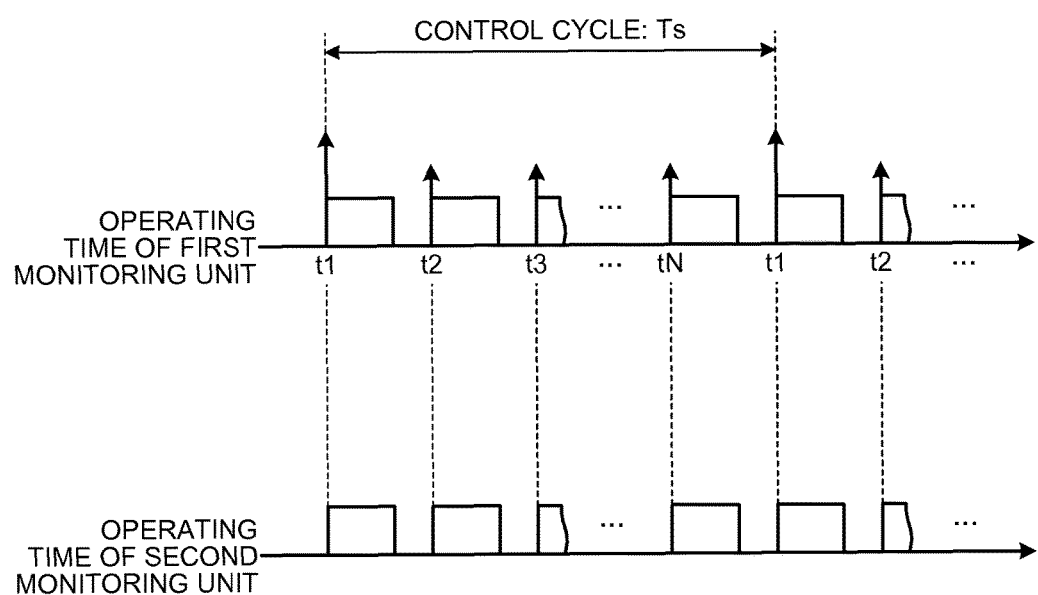
FIG. 3 is a timing chart illustrating an example of the operating times of a first monitoring unit and a second monitoring unit.

FIG. 3 is a timing chart illustrating an example of the operating times of a first monitoring unit and a second monitoring unit. In FIG. 3, the horizontal axis represents time, and the vertical axis represents an on/off state. Ts represents a control cycle. That is, the control device 10 repeatedly operates a series of processes in the period of the control cycle Ts, in which the control device 10 performs calculations using the data 31-1 to output an operation signal to the controlled device 20, then performs calculations using the data 31-2 to output an operation signal to the controlled device 20, . . . , and performs calculations using the data 31-N to output an operation signal to the controlled device 20.

As illustrated in FIG. 3, when the number of the communication units 11-1 to 11-N is set as N, the first monitoring unit 14-1 is configured to be capable of receiving N interrupts. In FIG. 3, t1 to tN represent when the N interrupts occur. The N interrupts occur at a predetermined time interval (Ts/N).

As illustrated in FIG. 3, at a time t1, the first monitoring unit 14-1 obtains the data 31-1 that corresponds to the time t1 from the storage unit 13, and it performs calculations that are preset for the data 31-1 (Step S14). Concurrently, the second monitoring unit 14-2 also obtains the data 31-1 that corresponds to the time t1 from the storage unit 13, and it performs calculations that are preset for the data 31-1 and in synchronization with the first monitoring unit 14-1 (Step S15). Note that data obtained by the first monitoring unit 14-1 and data obtained by the second monitoring unit 14-2 are the same, which is the same data 31-1 that is in the storage unit 13.

The first monitoring unit 14-1 and the second monitoring unit 14-2 then independently determine whether the calculation value satisfies their own blocking conditions (Steps S16 and S18). Examples of the blocking conditions are those described above as the cases (1) to (4). When both the first monitoring unit 14-1 and the second monitoring unit 14-2 determine that the calculation value does not satisfy the blocking condition (NO at both Steps S16 and S18), the controlling process using the data 31-1 is normally operated, and, therefore, the controlling process mentioned above operated by the control unit 12 continues. The first monitoring unit 14-1 and the second monitoring unit 14-2 then determine whether the interrupt time at Step S13 is an interrupt time tN corresponding to the data 31-N, which is the last data (whether i=N) (Step S20).

When the interrupt time at Step S13 is not the interrupt time tN that corresponds to the last data 31-N (NO at Step S20), the first monitoring unit 14-1 and the second monitoring unit 14-2 wait for the next interrupt time. That is, i is set i+1 (Step S21); the process is returned to Step S13; and the first monitoring unit 14-1 and the second monitoring unit 14-2 wait for the next interrupt time ti+1. Thereafter, the processes explained at Steps S13 to S19 described above are performed.

Furthermore, when the interrupt time at Step S13 is the interrupt time tN that corresponds to the last data 31-N (YES at Step S20), the control cycle Ts ends, and the next control cycle Ts is executed. Therefore, the first monitoring unit 14-1 and the second monitoring unit 14-2 wait for a first interrupt time t1. That is, the process is returned to Step S12 to set i to 1, and the first monitoring unit 14-1 and the second monitoring unit 14-2 wait for the interrupt time t1. Thereafter, the process explained at Steps S13 to S19 described above is performed.

When a calculation value, calculated by an interrupt having occurred at each time ti (i=1 to N), does not satisfy a blocking condition, the interrupt having occurred at each time ti (i=1 to N) is received by the first monitoring unit 14-1; and data 31-*i* that corresponds to the interrupt time ti is input from the storage unit 13 to the first monitoring unit 14-1. Simultaneously, the same data 31-*i* is input from the storage unit 13 to the second monitoring unit 14-2 in synchronization with the first monitoring unit 14-1. The process, in which the first monitoring unit 14-1 and the second monitoring unit 14-2 perform a calculating process on the basis of the data 31-*i* having been input thereto, is then repeatedly performed and the process then waits until the next interrupt occurs when the calculation value does not satisfy a blocking condition.

In contrast, when the first monitoring unit 14-1 determines that the calculation value satisfies the blocking condition at Step S16 (YES at Step S16), the first monitoring unit 14-1 outputs a blocking signal to the first blocking unit 15-1 (Step S17). The first blocking unit 15-1 having received the blocking signal blocks an operation signal output from the control unit 12 from reaching the controlled device 20.

When the second monitoring unit 14-2 determines that the calculation value satisfies the blocking condition at Step S18 (YES at Step S18), the second monitoring unit 14-2 outputs a blocking signal to the second blocking unit 15-2 (Step S19). The second blocking unit 15-2 having received the blocking signal blocks an operation signal output from the control unit 12 from reaching the controlled device 20.

Because after Step S17 or Step S19, the operation signal from the control device 10 is not input to the controlled device 20, the controlled device 20 is deactivated. After finishing the steps described above, the monitoring process performed by the control device 10 finishes.

In the first embodiment, the control device 10 connected to the measurement control devices 30-1 to 30-N through the networks 40-1 to 40-N includes the storage unit 13, which temporarily stores therein the data 31-1 to 31-N input from the communication units 11-1 to 11-N connected to the measurement control devices 30-1 to 30-N. Further, the first monitoring unit 14-1 and the second monitoring unit 14-2 are configured to perform calculations on the basis of the data 31-1 to 31-N input from the storage unit 13 at a predetermined time and to output their respective blocking signals for deactivating the controlled device 20 when the calculation value satisfies a blocking condition. This makes it possible for the data 31-1 to 31-N input through the networks 40-1 to 40-N to be double monitored by the first monitoring unit 14-1 and the second monitoring unit 14-2. Therefore, the controlled device 20 can be deactivated safely on the basis of the data 31-1 to 31-N.

In the example described above, N interrupts occur at a predetermined time interval. However, an interrupt can occur at a time when the data 31-1 to 31-N is input from the measurement control devices 30-1 to 30-N to the communication units 11-1 to 11-N. Here, the order of priority of the N interrupts can be set according to the level of importance of the data 31-1 to 31-N input from the measurement control devices 30-1 to 30-N. By setting the order of priority as described above, data with a higher level of urgency is processed with higher priority, and therefore it is possible to further improve safety.

Second Embodiment

Figure 4:
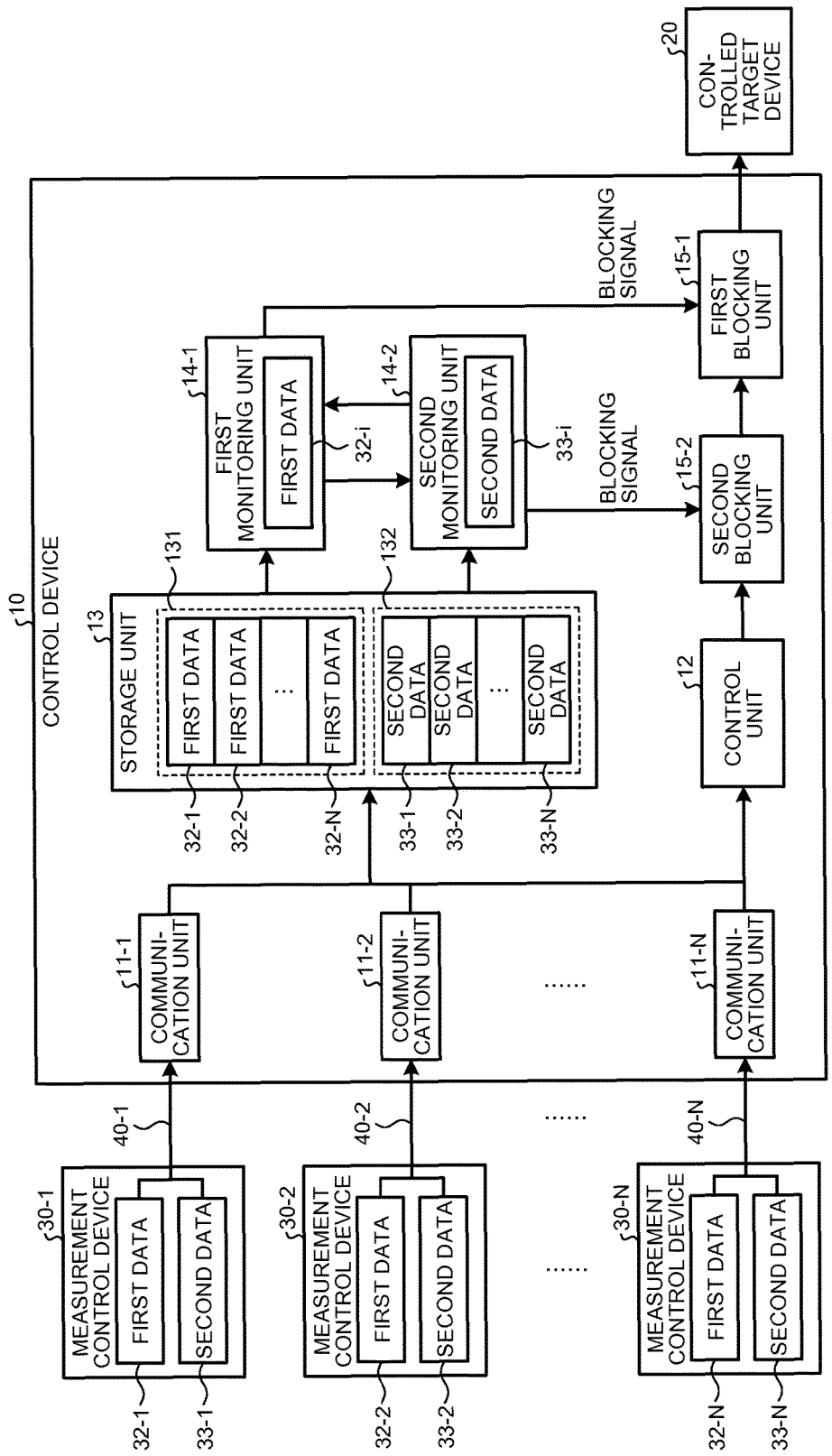
FIG. 4 is a block diagram schematically illustrating a configuration example of a control system that includes a control device according to a second embodiment.

FIG. 4 is a block diagram schematically illustrating a configuration example of a control system that includes a control device according to a second embodiment. In the second embodiment, each of the measurement control devices 30-1 to 30-N generate and output first data 32-1 to 32-N and second data 33-1 to 33-N, respectively, that are two collections of data indicating identical information. While the first data 32-1 to 32-N and the second data 33-1 to 33-N are data indicating identical information, they can be completely identical data generated by the same processing unit or by the same algorithm, or can be identical information generated by different processing units or by different algorithms. As described above, because two collections of data are transmitted to the storage unit 13 from each of the measurement control devices 30-1 to 30-N, the storage unit 13 includes a first data storage area 131 that stores therein the first data 32-1 to 32-N, and a second data storage area 132 that stores therein the second data 33-1 to 33-N. The first data 32-1 to 32-N received by the communication units 11-1 to 11-N is stored at a predetermined address in the first data storage area 131. The second data 33-1 to 33-N received by the communication units 11-1 to 11-N is stored at a predetermined address in the second data storage area 132.

The first monitoring unit 14-1 performs calculations using the first data 32-1 to 32-N in the first data storage area 131 of the storage unit 13. The second monitoring unit 14-2 performs calculations using the second data 33-1 to 33-N in the second data storage area 132 of the storage unit 13. The first monitoring unit 14-1 and the second monitoring unit 14-2 determine whether the calculation result satisfies a blocking condition and determine whether an output of an operation signal to the controlled device 20 is to be blocked. When it is determined that the output of the operation signal is to be blocked, the first monitoring unit 14-1 and the second monitoring unit 14-2 output their respective blocking signals. Examples of the blocking conditions are the following cases (5) to (8).

(5) Data from the measurement control devices 30-1 to 30-N indicates a command for deactivating the controlled device 20.

(6) A communication error is detected in data input from the measurement control devices 30-1 to 30-N.

(7) Data input to the first monitoring unit 14-1 and data input to the second monitoring unit 14-2 are checked against each other; and the information, which both collections of input data indicate, are found not to be identical. For example, the first monitoring unit 14-1 and the second monitoring unit 14-2 obtain the first data **32-*i* and the second data 33-*i*, respectively, then check the first data 32-*i* and the second data 33-*i* against each other as to whether they indicate identical information before performing any calculations and cannot determine that the first data 32-*i* and the second data 33-*i*** indicate identical information.

(8) Input data satisfies a predetermined condition. For example, the motor speed input from one measurement control device exceeds a predetermined value, or the difference between a position command from one measurement control device and a feedback position from another measurement control device exceeds a predetermined value.

The control unit 12 can perform calculations using the first data 32-1 to 32-N or can perform calculations using the second data 33-1 to 33-N. The same constituent elements as those in the first embodiment illustrated in FIG. 1 are denoted with the same reference signs and explanations thereof will be omitted. The controlling process and the monitoring process in the control device 10 configured as described above are the same as those explained in the first embodiment except that the first monitoring unit 14-1 performs calculations using the first data 32-1 to 32-N, and the second monitoring unit 14-2 performs calculations using the second data 33-1 to 33-N. Therefore, detailed explanations of the controlling process and the monitoring process will be omitted.

In the second embodiment, the control device 10, connected to the measurement control devices 30-1 to 30-N through the networks 40-1 to 40-N, respectively, includes the storage unit 13, which includes the first data storage area 131 that temporarily stores therein the first data 32-1 to 32-N input from the communication units 11-1 to 11-N connected to the measurement control devices 30-1 to 30-N and which includes the second data storage area 132 that temporarily stores therein the second data 33-1 to 33-N. The first monitoring unit 14-1 is configured to perform calculations on the basis of the first data 32-1 to 32-N input from the first data storage area 131 at a predetermined time. The second monitoring unit 14-2 is configured to perform calculations on the basis of the second data 33-1 to 33-N input from the second data storage area 132 at a predetermined time. The first monitoring unit 14-1 and the second monitoring unit 14-2 are also configured to output their respective blocking signals for deactivating the controlled device 20 when the calculation value satisfies a blocking condition. With this configuration, the first monitoring unit 14-1 and the second monitoring unit 14-2 use two collections of data obtained from each of the measurement control devices 30-1 to 30-N to perform monitoring on, and therefore can block the operation signal transmitted from the control unit 12 to the controlled device 20 in a case where the received data has high chance of being abnormal.

INDUSTRIAL APPLICABILITY

As described above, the control device according to the present invention is suitable for use as a control device that controls a controlled device such as a mechanical device, equipment, and machinery.

REFERENCE SIGNS LIST

10 control device; 11-1 to 11-N communication unit; 12 control unit; 13 storage unit; 14-1 first monitoring unit; 14-2 second monitoring unit; 15-1 first blocking unit; 15-2 second blocking unit; 20 controlled device; 30-1 to 30-N measurement control device; 31-1 to 31-N, 32-1 to 32-N, and 33-1 to 33-N data; 40-1 to 40-N network; 131 first data storage area; 132 second data storage area.

The invention claimed is:

1. A control device comprising:
a plurality of communication units respectively connected to a plurality of measurement control devices, and that receive data from the measurement control devices;
a control unit comprising a CPU that calculates an operation signal for controlling a controlled target device on the basis of data received from the communication units and that outputs the operation signal;

a storage unit that stores therein the data received from the communication units, the storage unit includes a first data storage area that stores therein first data from the communication units, and a second data storage area that stores therein second data from the communication units;

a first monitoring unit and a second monitoring unit that are independent of each other, the first monitoring unit and the second monitoring unit check the first data and the second data obtained from the storage unit against each other to determine whether the first data and the second data indicate identical information, and output a blocking signal when the first data and the second data are not determined to indicate identical information; and a blocking unit that blocks the operation signal output from the control unit to the controlled device upon receiving the blocking signal output from at least either one of the first monitoring unit and the second monitoring unit, wherein when the operation signal output from the control unit is not blocked the operation signal is received and executed by the controlled target device to control the controlled target device.

2. The control device according to claim 1, wherein the blocking unit includes a first blocking unit that blocks the operation signal output from the control unit to the controlled target device upon receiving the blocking signal output from the first monitoring unit, and a second blocking unit that blocks the operation signal output from the control unit to the controlled target device upon receiving the blocking signal output from the second monitoring unit, and the first blocking unit and the second blocking unit are connected in series between the control unit and the controlled target device.

3. The control device according to claim 1, wherein the first monitoring unit is capable of receiving a number of interrupts equal to the number of communication units and obtains data that corresponds to each interrupt from the storage unit when the interrupt is received, and the second monitoring unit obtains data that corresponds to the interrupt from the storage unit in synchronization with the first monitoring unit.

4. The control device according to claim 3, wherein the interrupts occur at a predetermined time interval.

5. The control device according to claim 3, wherein each interrupt occurs when data from a measurement control device is received by the respective communication unit, and an order of priority, assigned to the data from each of the measurement control devices according to a predetermined rule, is set for the interrupts.

6. The control device according to claim 1, wherein each communication unit receives the first data and second data that are two collections of data indicating identical information from the respective measurement control device.

7. A control method for a controlled target device that includes a plurality of communication units connected to a plurality of measurement control devices through a plurality of networks, a control unit, a storage unit, a first monitoring unit and a second monitoring unit that are independent of each other, and a blocking unit, the control method comprising:

receiving, by each of the plurality of communication units, data from a respective measurement control device;

calculating, by the control unit, an operation signal for controlling the controlled target device on the basis of data received from the communication units;

storing, by the storage unit, the data from the communication units, the storage unit includes a first data storage area that stores therein first data from the communication units, and a second data storage area that stores therein second data from the communication units;

checking, by the first monitoring unit and the second monitoring unit, the first data and the second data obtained from the storage unit against each other to determine whether the first data and the second data indicate identical information;

outputting, by the first monitoring unit and the second monitoring unit, a blocking signal when the first data and the second data are not determined to indicate identical information;

blocking, by the blocking unit, the operation signal from being outputted by the control unit to the controlled target device upon receiving the blocking signal output from at least either one of the first monitoring unit and the second monitoring unit;

receiving, by the controlled target device, the operation signal when the operation signal output from the control unit is not blocked; and executing, by the controlled target device, the operation signal, wherein the operation signal controls the controlled target device.

* * * * *